United States Patent [19]

Tsukada

[11] Patent Number: 5,013,164
[45] Date of Patent: May 7, 1991

[54] CONSTANT PRESSURE PRELOAD LINEAR GUIDE BEARING APPARATUS

[75] Inventor: Toru Tsukada, Maebashi, Japan

[73] Assignee: Nippon Seiko Kabushiki Kaisha, Tokyo, Japan

[21] Appl. No.: 572,616

[22] Filed: Aug. 23, 1990

[30] Foreign Application Priority Data

Aug. 29, 1989 [JP] Japan .................. 1-100665p7 Yp8

[51] Int. Cl.⁵ .................. F16C 29/06; F16H 26/22
[52] U.S. Cl. .................. 384/45; 74/424.8 R; 384/54
[58] Field of Search .................. 384/43–45, 384/54; 74/424.8 R

[56] References Cited

U.S. PATENT DOCUMENTS

| | | | |
|---|---|---|---|
| 3,940,186 | 2/1976 | Nilsson | 384/45 |
| 4,253,709 | 3/1981 | Teramachi | 308/6 C |
| 4,426,119 | 1/1984 | Mottate | 308/6 C |
| 4,527,840 | 7/1985 | Mugglestone et al. | 384/45 |
| 4,630,872 | 12/1986 | Teramachi | 384/45 |
| 4,929,096 | 5/1990 | Osawa | 384/45 |
| 4,932,279 | 6/1990 | Kasuga | 74/424.8 R |

Primary Examiner—Thomas R. Hannon
Attorney, Agent, or Firm—Basile and Hanlon

[57] ABSTRACT

A linear guide bearing apparatus includes a guide rail having an H-shaped cross section and an axially extending through bore. A slider having an I-shaped cross section is fitted into the through bore for movement in the axial direction. The slider is formed of a table member, a leg member, and a distance member formed of an elastic body and sandwiched between the table member and the leg member. The table member, the distance mebmer, and the leg member are integrally coupled by a bolt penetrating these members vertically. A clamping spring member is threadedly engaged with a low end of the bolt so that the elastic distance member is compressed vertically and the table member and the leg member are elastically pressed against the guide rail by the clamping spring member through the elastic distance member. As a result, balls inserted between the ball rolling grooves of the guide rail and the slider are preloaded at a constant pressure.

3 Claims, 4 Drawing Sheets

CONSTANT PRESSURE PRELOAD LINEAR GUIDE BEARING APPARATUS

BACKGROUND OF THE INVENTION

1. Field of the Invention

The present invention relates to a constant pressure preload linear guide bearing apparatus in which the wear and vibration of rolling members are reduced by applying a constant pressure preload to the rolling members which are interposed between a guide rail and a slider.

2. Description of the Prior Art

Prior art linear guide bearing apparatus are, for example, shown in FIGS. 10 to 12. In either case, a slider 2 is straddlingly mounted on a guide rail 1 through a plurality of balls 3 as rolling members. The slider 2 moves very smoothly on the guide rail 1 with a small force owing to a circular rolling motion of the balls 3. During the movement of the slider 2, in order to maintain a high motion accuracy by suppressing pitching and yawing of the slider 2 and in order to increase the rigidity by reducing the amount of elastic deformation due to an external load, typically, the linear guide bearing is applied with a preload.

Various types of preloading are available. FIGS. 10 and 11 show one type in which the balls 3 which are interposed between the guide rail 1 and the slider 2 are made as over-sized balls and are fitted with an interference between the guide rail 1 and the slider 2. Specifically, the steel balls 3 which are slightly larger than a ball space formed between a ball groove 4 of the guide rail 1 and a ball groove 5 of the slider 2, both of the grooves 4 and 5 being opposing each other, are inserted into a ball space to thereby apply a fixed position preload. On the other hand, FIG. 12 shows another type of preloading in which a bearing plate 6 carrying a ball groove 5 of a slider 2 is pressed towards a guide rail by clamping a preload adjusting screw 7 thereto to apply a fixed position preload.

However, in the prior art preloading mechanisms described above, each applies a fixed position preload. Such a fixed position preload involves a problem in that the preload is reduced due to initial wear, or wear which increases progressively during use and, when the wear is further increased, a gap will be formed between a ball groove surface and the balls.

Furthermore, in a linear guide bearing apparatus using rolling members, such as steel balls or rollers, a problem is involved in that although frictional resistance is small and movement is smooth as compared with slide guide apparatus, the damping effect for vibrations is very inferior.

SUMMARY OF THE INVENTION

The present invention was made in view of the problems in the prior art mentioned above and it is an object of the invention to provide a linear guide apparatus in which a constant pressure preloading is applied by using rolling members to prevent a decrease in the preload and to reduce vibrations.

A constant pressure preload linear guide bearing apparatus of the present invention comprises a guide rail having an H-shaped cross section and an axially extending through bore formed in a web located at a center portion of the guide rail. The guide rail has a pair of upper rolling member rolling grooves formed in base portions of an upper surface of the web and a pair of lower rolling member rolling grooves formed in base portions of a lower surface of the web. A slider inserted into the through bore of the guide rail and movable in an axial direction has a substantially I-shaped cross section. The slider includes two pairs of upper and lower rolling member rolling grooves formed in both lateral sides respectively opposing the upper and lower pairs of rolling member rolling grooves of the guide rail. A plurality of balls are movably inserted in the opposing rolling member rolling grooves of the guide rail and the slider. The slider includes a table member having the pair of upper rolling member rolling grooves formed in both of the lateral sides respectively opposing the pair of upper rolling member rolling grooves formed in the base portions of the upper surface of the web of the guide rail. The table member has a pair of rolling member circulating paths respectively disposed in communication with the upper rolling member rolling grooves of the table member. The table member also includes a leg member having the pair of lower rolling member rolling grooves formed in both of the lateral sides respectively opposing the pair of lower rolling member rolling grooves formed in the base portions of the lower surfaces of the web of the guide rail. The leg member has a pair of rolling member circulating paths respectively disposed in communication with the lower rolling member rolling grooves of the leg member. The leg member also includes a distance member formed of an elastic member sandwiched between the table member and the leg member and integrally connected by a bolt through the clamping spring member so that the distance member is held in a compressed condition with outer side surfaces of the distance member expanded outwardly due to an elastic force of the clamping spring member.

Furthermore, the distance member may be formed with a bore for inserting a ball screw shaft therethrough. A nut threadedly engaged with the screw shaft which is driven by a motor mounted on the guide rail is held by the slider.

An upper surface of the guide rail may be covered with a dust cover having take-up portions at opposite ends.

In the constant pressure preload linear guide apparatus of the present invention, the clamping spring member of the slider brings the table member and the leg member into pressing contact with the guide rail through the distance member formed of the elastic body. Accordingly, a constant pressure preload is applied to the rolling members in the rolling member rolling grooves. As a result, it is possible to prevent a decrease in the preload and to prevent a gap from being formed between the rooling members and the rolling surfaces of the grooves due to an increase in wear of the rolling members.

Furthermore, the distance member formed of an elastic body absorbs vibrations effectively in all directions including a vibration in a vertical direction, a vibration in a transverse direction, and a vibration in a twisting direction.

DESCRIPTION OF THE PREFERRED EMBODIMENTS

FIGS. 1 to 5 show one embodiment of the present invention.

Figure 3:
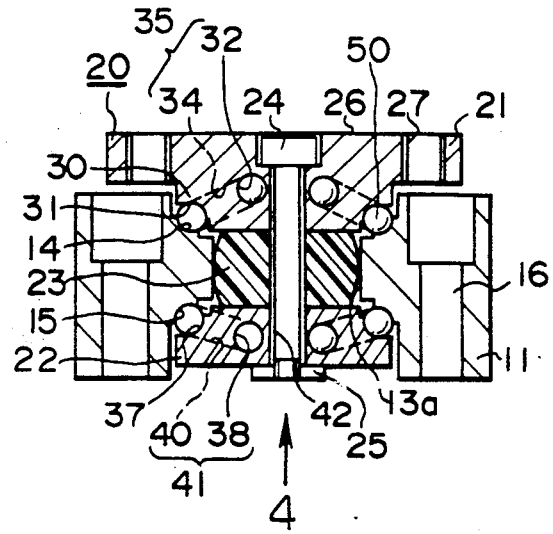
FIG. 3 is a cross-sectional view taken along the line 3—3 in FIG. 2.

A guide rail 11 has an H-shaped cross section (FIG. 3). A web 12 at the center of the guide rail 11 has a through bore 13 extending therealong in an axial direction. The web 12 has a pair of upper rolling member rolling grooves 14 formed in upper surfaces of base portions and extending in the axial direction and has a pair of lower rolling member rolling grooves 15 formed in lower surfaces of base portions of the web 12 in parallel to the upper rolling member rolling grooves 14. A bolt bore 16 is formed in each of side wall portions of the guide rail 11 for inserting a fixing bolt therethrough.

A slider 20 has a substantially I-shape. A trunk portion of the slider 20 is inserted through the through bore 13 and fitted into the guide rail 11. The slider 20 is movable in the axial direction through balls 50 interposed between the slider 20 and the guide rail 11. Specifically, as shown in FIG. 3, the slider 20 is composed of three members including a table member 21 made of metal, a leg member 22 made of metal, and a distance member 23 formed of an elastic body of a synthetic resin, such as a rigid rubber or the like, which is sandwiched between the table member 21 and the leg member 22. The three members 21, 22 and 23 are integrally coupled by superposing the three members 21, 22 and 23 on one another and by inserting a clamping bolt 24 through the center of the three members 21, 22 and 23 and threadedly engaging a spring nut member 25 with the clamping bolt 24.

A table surface 26 of the table member 21 extends laterally beyond an upper surface of the guide rail 11. Bolt threaded bores 27 are formed in the table surface 26 to attach a member to be carried thereto. On a lower side of the table member 21, there is formed a protruding portion 30 which protrudes downwardly into an upper recess of the H-shaped guide rail 11. Upper rolling member rolling grooves 31 are formed in both of the lateral sides of the protruding portion 30 so that the upper rolling member rolling grooves 31 respectively oppose the upper rolling member rolling grooves 14 formed in the upper surface of base portions of web 12 of the guide rail 11. Furthermore, a pair of through bores 32 having a circular cross section are formed in a thick wall portion of the table member 21 and penetrate axially in parallel to the upper rolling member rolling grooves 31. End caps 33 are respectively joined to opposite ends or the front and rear ends of the protruding portion 30 of the table member 21. The end caps 33 are synthetic resin molded products. Each end cap 33 is formed with a pair of curved paths 34 having a half-doughnut shape for respectively communicating the corresponding pair of the upper rolling member rolling groove 31 and the through bore 32. The curved paths 34 of the front and rear end caps 33 and the through bore 32 constitutes a rolling member circulating path 35.

The leg member 22 is accommodated in a lower recess of the H-shaped guide rail 11. Lower rolling member rolling grooves 37 are formed in both of the lateral sides of the leg member 22 so that the lower rolling member rolling grooves 37 respectively oppose the lower rolling member rolling grooves 15 formed in the lower surfaces of base portions of the web 12. Furthermore, a pair of through bores 38 having a circular cross section are formed in a thick wall portion of the leg member 22 so that the through bores 38 extend in the axial direction in parallel to the lower rolling member rolling grooves 37. End caps 39 are respectively joined to the front and rear end faces of the leg member 22. Each end cap 39 is formed with a pair of curved paths 40 having a half-doughnut shape to communicate corresponding pairs of the lower rolling member rolling grooves 37 and the through bores 38 which are in parallel to the former. The curved path 40 in the end cap 39 and the through bore 38 constitute a rolling member circulating path 41.

Figure 1:
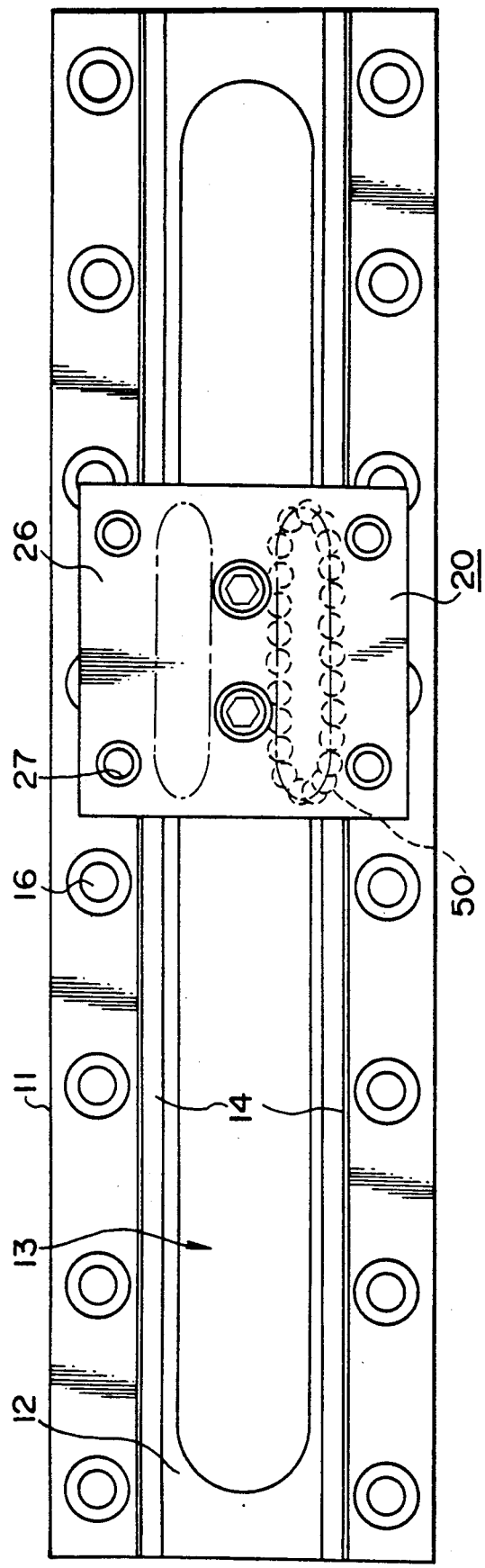
FIG. 1 is a plan view of a first embodiment of the present invention.
Figure 2:
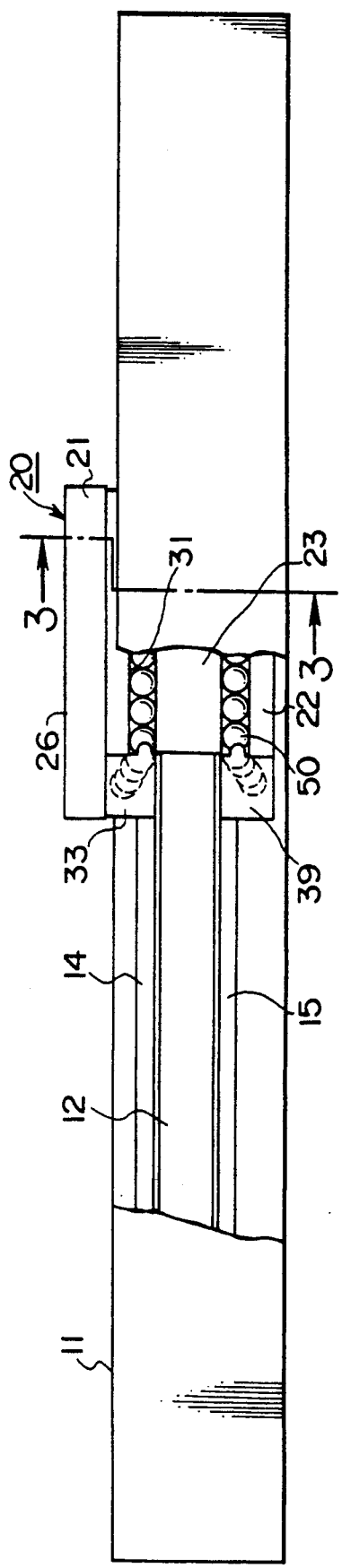
FIG. 2 is a partially cut-out side elevational view of the apparatus shown in FIG. 1.
Figure 4:
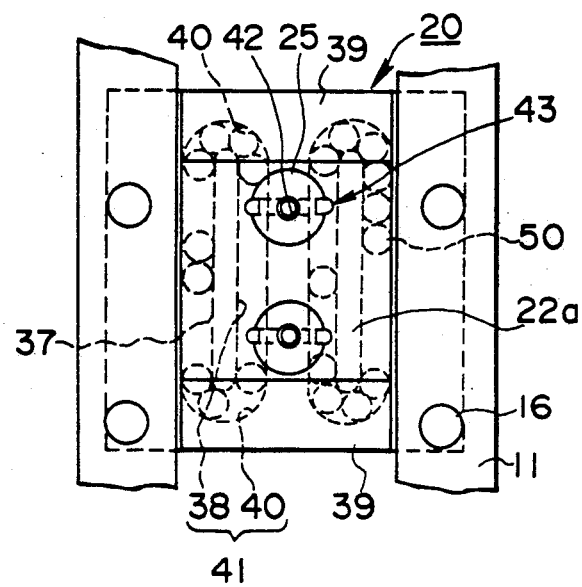
FIG. 4 is a view in the direction of arrow 4 in FIG. 3.

As shown in FIG. 4, a recessed groove formed in a lower surface 22a of the leg member 22 and traversing the through bore 42 of the clamping bolt 24 serves as a turn preventing groove 43.

Figure 5:
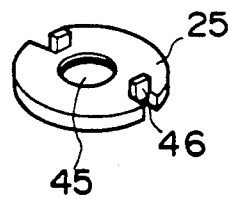
FIG. 5 is a perspective view of a clamping spring member.

As shown in FIG. 5, the spring nut member 25 is formed of a circular metal plate having a female thread 45 formed in the center thereof. Projections 46 are formed at two diametrically opposed positions over the female thread 45. The projections 46 are formed by cutting a plate peripheral edge and bending the edge uprightly. The nut member 25 is formed by stamping in the shape of a belleville spring and is slightly curved.

In mounting the slider 20 in the guide rail 11, the distance member 23, which is rectangular in a free condition, is inserted through the through bore 13 of the guide rail 11 and the table member 21 is superposed on an upper surface of the distance member 23. At the same time, the leg member 22 is placed on a lower surface of the distance member 23. Then the clamping bolt 24 is inserted through the three members 21, 22 and 23 and the spring nut member 25 is engaged with the clamping bolt 24. Following this, the clamping bolt 24 is clamped to the projections 46 of the spring nut member 25 fitted into the turn preventing groove 43 formed in the leg member 22. By this clamping, the spring nut member 25 is elastically deformed in a flattening direction. Due to the elastic force of the spring nut member 25, the table member 21 and the leg member 22 are pulled in a direction to approach each other respectively downwardly and upwardly to thereby compress the distance member 23 which is sandwiched between the table member 21 and the leg member 22. As a result, the lateral sides of the distance member 23 are expanded outwardly and brought into contact with the inner wall surfaces of the through bore 13 of the guide rail 11.

At the same time, due to the action of the elastic force of the spring nut member 25, the rolling members 50 constituted by steel balls inserted between the upper and lower rolling member rolling grooves 14 and 15 of the guide rail 11 and the upper and lower rolling member rolling grooves 31 and 37 of the slider 20 are elastically pressed and sandwiched between the groove surfaces of respective rolling grooves and the rolling members 50 so as to be applied with a constant pressure preload.

When the guide rail 11 is secured in a predetermined position with bolts (not shown) inserted through the bolt bores 16 and, when the slider 20 is moved in an axial direction on the guide rail 11, the rolling members 50 in the upper rolling member rolling grooves 14 and 31 and the rolling members 50 in the lower rolling member rolling grooves 15 and 37 are respectively moved relative to the slider 20 with the movement of the slider 20.

Hereinafter, the operation of the rolling members 50 in the upper rolling member rolling grooves 14 and 31 will be described. The description of the operation of the rolling members 50 in the other grooves is omitted since it is the same. The moved rolling members 50, at one end of the slider 20, make a U-turn by being led by the half-doughnut shaped curved path 34 formed in the end cap 33, are subsequently moved through the through bore 32 of the rolling member circulating path 35, and again make a U-turn by being led by the half-doughnut shaped curved path 34 formed in the end cap 33 at the other end of the slider 20 to return to the upper rolling member rolling grooves 14 and 31. In this manner, the rolling members 50 repeat circulation while rolling and moving.

Due to the repetition of the circulation mentioned above, wear of the rolling members 50 gradually increases. In the case of the constant position preloading in the prior art, the preload is decreased with increased wear, and eventually a gap is formed between the rolling members and the rolling groove surface. However, in the case of the present embodiment, a constant pressure preload due to the elastic force of the spring nut member 25 has been applied to automatically compensate for the wear of the rolling members 50. Accordingly, the situation in which the preload is decreased or a gap is formed will not occur.

Therefore, the rigidity of the slider 20 is maintained, and any yawing, pitching, and rolling are prevented. Thus, it is possible to operate the slider 20 with a high accuracy which is very stable for a long period.

Furthermore, since the distance member 23 having the elasticity is in contact with the inner walls 13a of the through bore 13 of the guide rail 11, any vibrations in the direction of movement and in the vertical direction are absorbed, and any vibrations of the slider 20 in the transverse direction and in the twisting direction are absorbed at contact surfaces, respectively, between the table member 21 and the distance member 23 and between the leg member 22 and the distance member 23. As a result, a high vibration absorbing property can be achieved.

Figure 6:
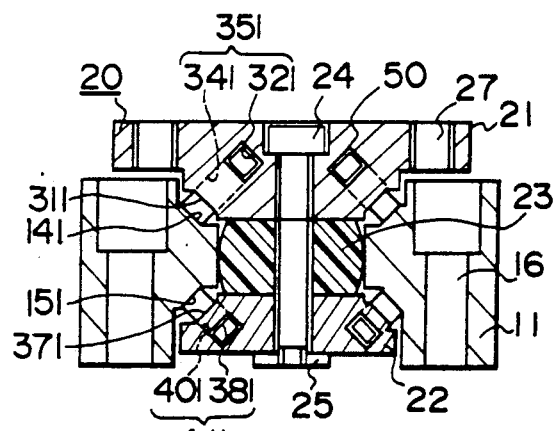
FIG. 6 is a cross-sectional view of a second embodiment of the present invention, similar to FIG. 3.

FIG. 6 shows another embodiment of the present invention.

This embodiment differs from the first embodiment in that rollers are used as the rolling members 50 instead of the balls. The shapes of the cross section of each of the rolling member rolling grooves 141, 151, 311 and 371, the rolling member circulating paths 351 consisting of through bores 321 and curved paths 341, and the rolling member circulating paths 411 consisting of through bores 381 and curved paths 401 are formed to match the shape of the rolling members 50.

When the rollers are used as the rolling members 50, it is advantageous that the load bearing capability be increased as compared with the balls.

Figure 9:
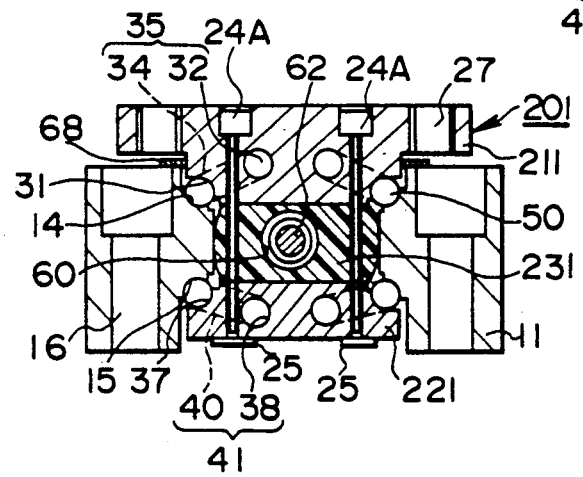
FIG. 9 is a cross-sectional view taken along the line 9—9 in FIG. 8.
Figure 7:
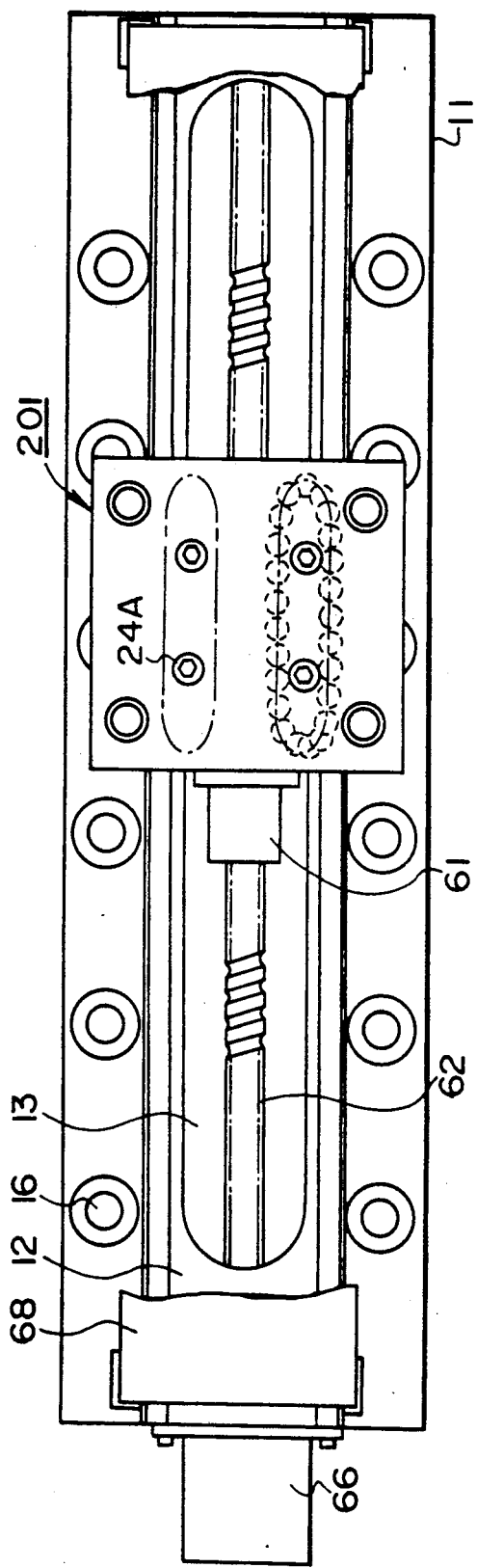
FIG. 7 is a plan view of third embodiment of the present invention.
Figure 8:
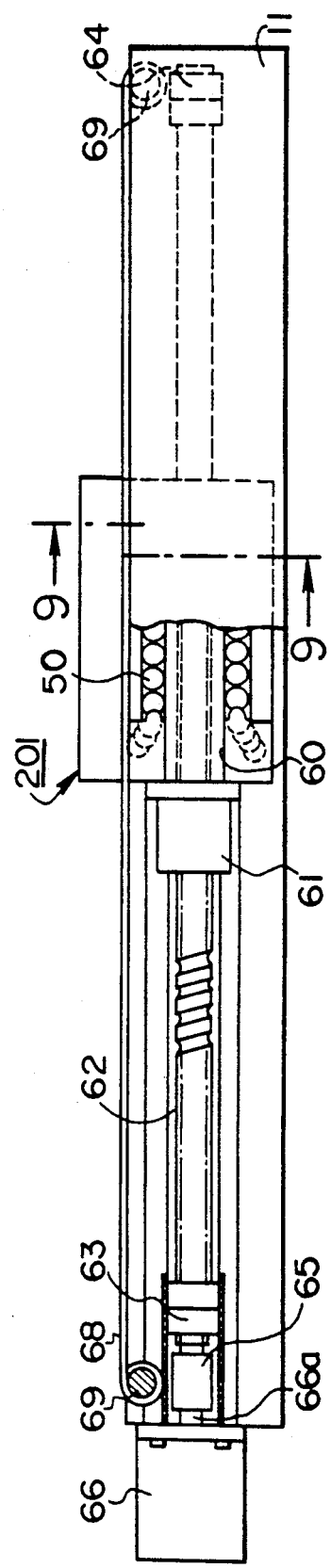
FIG. 8 is a partially cut-out side elevational view of the apparatus of FIG. 7.
Figure 10:
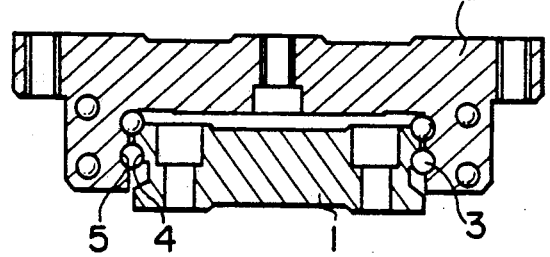
FIGS. 10, 11 and 12 show examples of prior art linear guide bearing apparatus.
Figure 11:
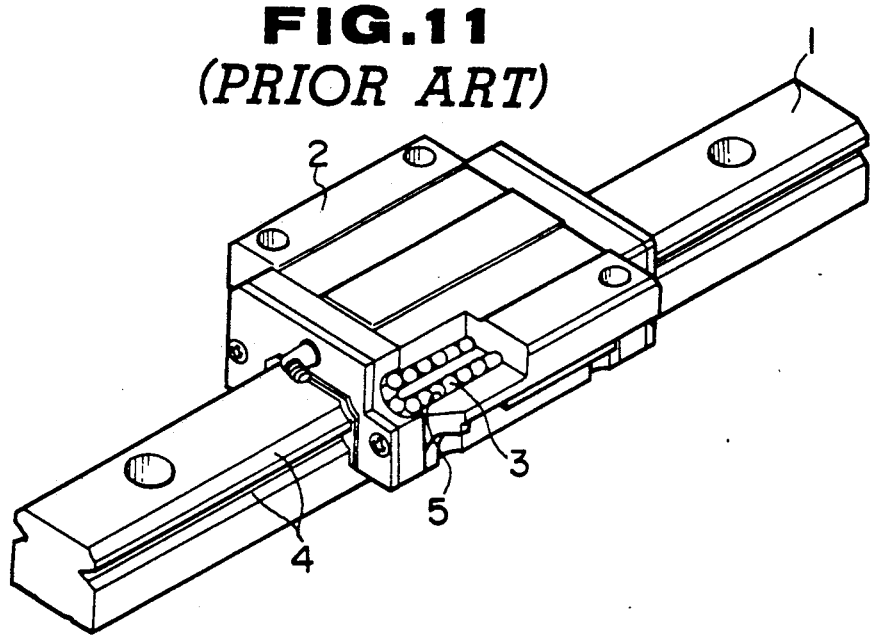
Figure 12:
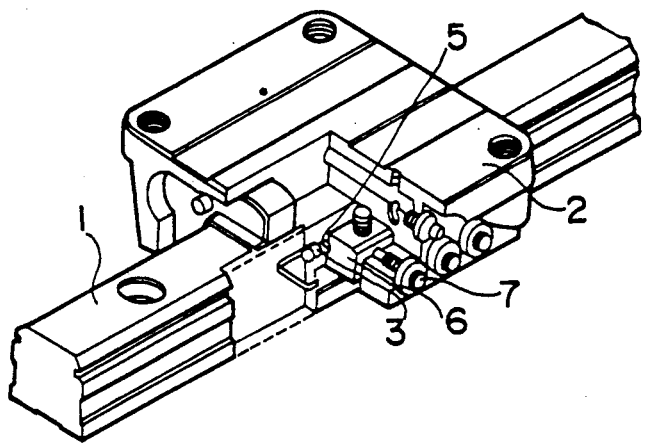

FIGS. 7 to 9 show still another embodiment of the present invention. In this embodiment, a one-axis table unit is constituted by the constant pressure linear guide bearing apparatus of the present invention. Specifically, a slider 201 is additionally formed with a ball screw shaft inserting bore 60 which penetrates through an axial center of a distance member 231 of the slider 20. Further, a nut 61 with a ball thread is secured to one end of the slider 201 coaxially with the ball screw shaft inserting bore 60. For this reason, clamping bolts 24A for integrally coupling a table member 211, a distance member 231, and a leg member 221 are attached at positions near both lateral sides of the slider 201 off the center of the cross section of the slider 201. The spring nut member 25 is engaged with each of the clamping bolts 24A.

The nut 61 of the ball thread is of a well-known structure (not shown) and has a circulating path for balls interposed between the ball screw shaft and the nut.

A screw shaft 62 of a ball thread is engaged with the nut 61. At the same time, the screw shaft 62 is inserted through the ball screw shaft inserting bore 60 of the distance member 231. Opposite ends of the screw shaft 62 are rotatably supported by bearings 63 and 64 which are fixed to opposite ends of the guide rail 11. One end of the screw shaft 62 at the side of the bearing 63 is extended and connected through a coupling 65 to an output shaft 66a of a screw shaft rotation driving motor 66. The driving motor 66 is mounted on an end face of the guide rail 11.

Furthermore, a dust cover 68 made of, for example, a thin steel plate extends over the entire length of the guide rail 11 to cover the recess in the upper side of the guide rail 11. Opposite ends of the dust cover 68 are respectively fixed to spring type take-up rolls 69. When an external force is applied in an axial direction to the dust cover 68, the front and rear take-up rolls 69 alternately perform winding and unwinding operations so as to enable the dust cover 68 to move in the direction of the external force.

The dust cover 68 is formed with a square bore at a center portion in a longitudinal direction. The slider 201 is disposed in engagement with the square bore.

When the screw shaft 62 is driven into rotation by the screw shaft rotation driving motor 66, the nut 61 with the ball thread engaged with the screw shaft 62 through balls (not shown) is driven in an axial direction depending on a direction of rotation of the screw shaft 62. As a result, the slider 201 is driven in the axial direction. Dust does not enter the inside of the guide rail 11 from the outside since the guide rail 11 is covered with the dust cover 68. Thus, dust is prevented from accumulating on the nut 61 and the screw shaft 62, the rolling member rolling grooves 14 and 15 of the guide rail 11, and the rolling member rolling grooves 31 and 37 of the slider 20 to insure a smooth operation.

The advantages in the rigidity of the slider 201, the vibration absorbing property, the prevention of a decrease of the preload due to an increase in the wear of the rolling members are the same as in the embodiments described in the foregoing.

While in the above embodiments, the nut member itself is constituted by a spring body, a combination of a nut and a spring washer may also be used.

In the present invention, as described in the foregoing, the clamping spring member of the slider forces the table member and the leg member to contact the guide rail with a pressure due to the compression of the distance member which is made of an elastic body and which is sandwiched between the table member and the leg member. Accordingly, a constant pressure preload is applied to the rolling members within the rolling member rolling grooves. As a result, it is possible to prevent a decrease in the preload and the generation of a gap between the rolling members and the rolling surfaces due to an increase in the wear of the rolling members.

Furthermore, the distance member made of an elastic body effectively absorbs vibrations in all directions including vibration in a feeding direction of the slider, vibration in a vertical direction, vibration in a transverse direction, and vibration in a twisting direction. As a result, an excellent vibration absorbing property can be achieved.

What is claimed is:

1. A constant pressure preload linear guide bearing apparatus comprising:

a guide rail having an H-shaped cross section and an axially extending through bore formed in a web located at an axial center portion of the guide rail, the guide rail having a pair of axially extending upper rolling member rolling grooves formed in upper surfaces of base portions of the web and having a pair of lower rolling member rolling grooves formed in lower surfaces of the base portions of the web;

a slider having a substantially I-shaped cross section and inserted into the through bore of the guide rail, the slider being movable in an axial direction, the slider including:

a table member having a pair of upper rolling member rolling grooves respectively formed in both lateral sides thereof so that the pair of upper rolling member rolling grooves respectively oppose the pair of upper rolling member rolling grooves in the web of the guide rail, the table member having a pair of rolling member circulating paths respectively disposed in communication with the pair of upper rolling member rolling grooves formed in both of the lateral sides of the table member, a leg member having a pair of lower rolling member rolling grooves formed in both lateral sides thereof so that the pair of lower rolling member rolling grooves respectively oppose the pair of lower rolling member rolling grooves in the web of the guide rail, the leg member having a pair of rolling member circulating paths respectively disposed in communication with the pair of lower rolling member rolling grooves formed in both of the lateral sides of the leg member, and a distance member formed of an elastic body sandwiched between the table member and the leg member and integrally coupled thereto by a clamping spring member, the distance member being held in a compressed condition so that outer side surfaces of the distance member are expanded outwardly due to an elastic force of the clamping spring member; and a plurality of balls movably inserted in the opposing rolling member rolling grooves of the guide rail and the slider.

2. The constant pressure preload linear guide bearing apparatus according to claim 1 wherein:

the distance member is formed with an axially extending through bore for inserting a ball screw shaft therethrough, and further including a nut held by the slider and threadedly engaged with the ball screw shaft which is driven by a motor mounted on the guide rail.

3. The constant pressure preload linear guide bearing apparatus according to claim 1 further comprising a dust cover for covering an upper surface of the guide rail, the dust cover having take-up portions at opposite ends thereof.

* * * * *